Sept. 23, 1958 L. M. J. BALFOUR 2,853,119
SEAT-SUPPORTING STRUCTURES FOR MOUNTING
ON ROOFS OF MOTOR CARS AND THE LIKE
Filed Sept. 7, 1954 2 Sheets-Sheet 1

INVENTOR
LIONEL M. J. BALFOUR
BY
ATTORNEY

Sept. 23, 1958     L. M. J. BALFOUR     2,853,119
SEAT-SUPPORTING STRUCTURES FOR MOUNTING
ON ROOFS OF MOTOR CARS AND THE LIKE
Filed Sept. 7, 1954     2 Sheets-Sheet 2

INVENTOR
LIONEL M. J. BALFOUR
BY
ATTORNEY

United States Patent Office 2,853,119
Patented Sept. 23, 1958

2,853,119

SEAT-SUPPORTING STRUCTURES FOR MOUNTING ON ROOFS OF MOTOR CARS AND THE LIKE

Lionel Maxwell Joachim Balfour, Petersfield, England

Application September 7, 1954, Serial No. 454,262

Claims priority, application Great Britain September 10, 1953

1 Claim. (Cl. 155—5)

This invention relates to seat-supporting structures for mounting on the roofs of automobiles and the like, for instance for the convenience of spectators at race meetings and other gatherings.

One object of the invention is to provide a seat-supporting structure built up from detachable parts which can be assembled for use and dismantled for transport and storage.

A further object is to provide a seat-supporting structure suitable for mounting on the roof of an automobile comprising a seat-supporting frame which will extend transversely across the roof and which is formed from two main frame members and two side frame members which can be detachably connected to the two main frame members to hold the latter at a predetermined distance apart, mountings at or near the sides of the frame for supporting it upon the flanks of the roof, and anchorages which can be detachably connected to the automobile for holding the frame in place on the roof.

Figure 1:
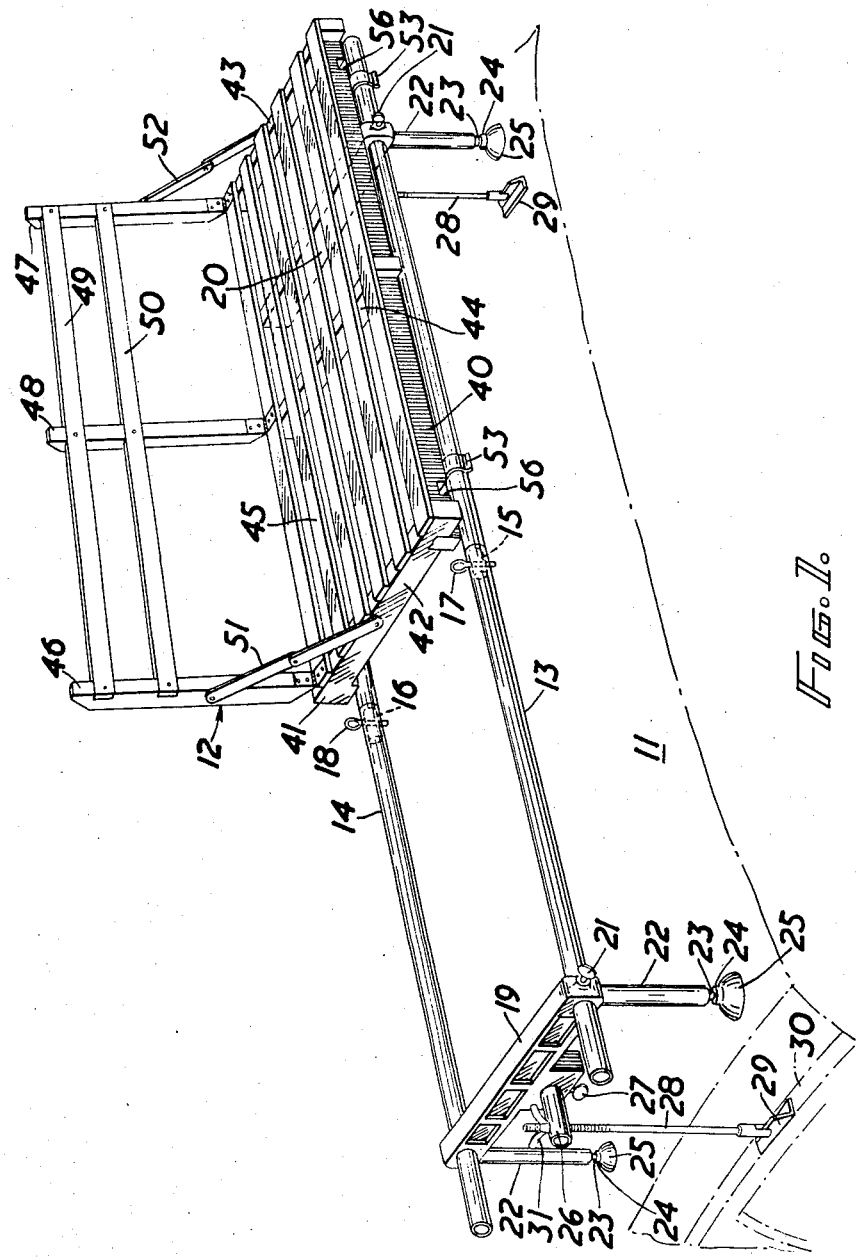
Figure 2:
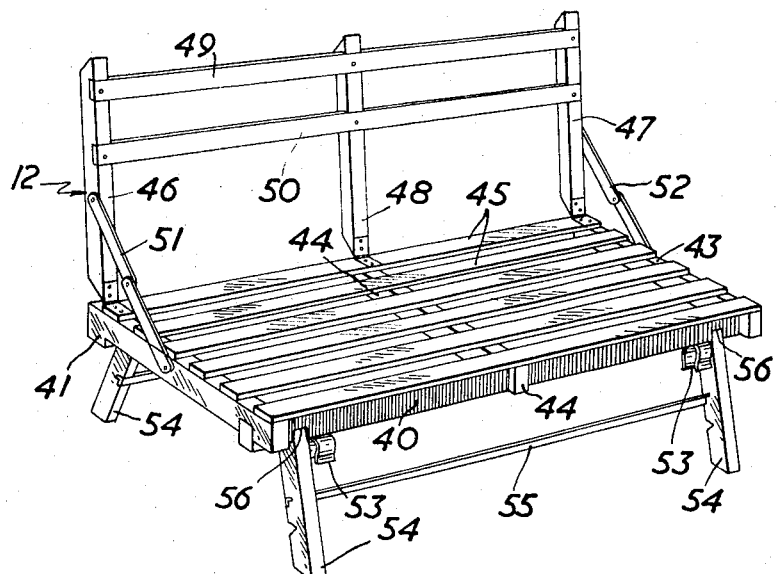

The invention may be performed in various ways, and one particular form of seat-supporting structure and a seat assembly for use therewith will now be specifically described by way of example with reference to the accompanying drawings, in which:

Figure 1 is a perspective view of the seat-supporting structure with one seat assembly mounted thereon, and Figure 2 is a perspective view of the seat assembly with its folding legs extended.

The seat-supporting structure shown in the drawings comprises a supporting frame 10 which extends transversely across the roof 11 of an automobile and which is intended to carry two seat assemblies 12, of which only one is shown in the drawings.

The frame 10 comprises two main frame members 13 and 14 each of which consists of two lengths of tube secured together end to end by spigot and socket connections 15 and 16 provided with locking pins 17 and 18. In this way the need for any very long members, which would be difficult to store and handle, is avoided. The frame also has two side frame members 19 and 20 which have holes near their ends through which pass the main frame tubes 13 and 14. Locking screws 21 are provided for locking the side frame members firmly in place on the main tube members 13 and 14, to provide a rigid frame structure.

Fastened rigidly to the undersides of the side frame members 19 and 20 are legs 22 of adjustable length. Each leg comprises an internally screw-threaded upper part into which is screwed an externally screw-threaded lower part 23. Each lower part 23 terminates in a ball which seats in a hemispherical socket 24 in a load-supporting pad 25 which rests on the flank of the roof 11, i. e. the part of the roof adjacent the edge thereof, where it is strongest. Thus the length of the legs can be adjusted to suit the contours of any particular roof, while the pads will automatically take up the most favourable angle, at which the load is uniformly distributed over the whole surface of the pads.

Adjustably mounted in each of the side frame members 19 and 20 is an outwardly projecting arm 26 which can be locked in position by a locking screw 27. Through the outer end of each arm 26 passes an anchorage member comprising a screwed rod 28 provided at its lower end with a hinged hook 29. The hook is adapted to fit under the edge lip 30 of the roof 11 at a door aperture, and by screwing down a wing nut 31 on the rod 28 the frame is rigidly held on the roof 11. The arm 26 is disposed at a lower level than the main frame tubes 13 and 14 so as to provide a clearance for the wing nut 31 beneath the seat assembly. The arm 26 enables a direct downward pull to be applied to the seat-supporting frame even though the side frame members are themselves somewhat inboard from the extreme edges of the roof. The downward pull of the anchorage rod 28 exerts a torque on each side frame member 19 or 20 tending to bow the main frame tubes 13 and 14 upwards, thereby tending to counteract the downward load exerted thereon by the seat assemblies and their occupants.

The frame illustrated is intended to support two identical seat assemblies arranged side by side transversely of the car, one of which is shown in Figures 1 and 2. The seat portion of each assembly is built up from front and rear transverse members 40 and 41 and longitudinal members 42, 43 and 44. The distance between the transverse members 40 and 41 is equal to the distance between the main frame tubes 13 and 14. The seat surface is formed by slats 45 extending transversely of the car across the longitudinal members. Cushions may be provided on these slats if desired. The back of the seat consists of three uprights 46, 47 and 48 provided with cross pieces 49 and 50 and hinged respectively to the rear ends of the longitudinal members 42, 43 and 44. The back can be folded forwards on to the surface of the seat when not in use, and is prevented from moving back too far by hinged links 51 and 52.

Secured to the underside of the front transverse member 40 are two clips 53 adapted to clip on to the front main frame tube 13. Similar clips are provided on the underside of the rear transverse member 41 for engaging the main frame tube 14, but these are not visible in the drawing. When the frame has been dismantled the tube lengths which go to make up the longitudinal frame members 13 and 14 can be clipped into the clips 53 for storage in a secure and rattle-free manner.

The seat assembly is also provided with legs 54 which are normally folded away under the seat beside the longitudinal members 42 and 43. If the seat assembly is to be used on the ground these legs can be swung out into the extended position shown in Figure 2. Lateral rigidity is provided by cross bars 55 and by arranging for the top ends of the legs 54 to fit into notches 56 formed in the undersides of the transverse members 40 and 41 in their extended position.

Other clips may be provided at suitable places on the seat assembly into which can be clipped detachable parts of the frame, such as the locking pins 17 and 18, to reduce the risk of such parts getting lost.

Instead of using a seat assembly as illustrated a simpler and cheaper form could be used, comprising a rectangular frame provided with attachment clips similar to the clips 53, and with canvas stretched across the frame to provide the seating surface. If desired, a back could be dispensed with. Moreover, practically any form of seat, chair or stool, for instance a folding deck chair, can be provided with attachment clips so that it can be used with the seat-supporting structure.

To facilitate access to the seats, a light folding ladder (not shown) may be provided. If desired, the top of the ladder may be attached to the frame, for instance by a plug which fits into a socket in the end of one of the main frame members. However, a plain ladder without attachment devices could be used, but this should be suitably protected by soft material or buffers to prevent scratching the paintwork of the automobile. Alternatively, steps may be provided which can be attached by suction cups to the bodywork of the automobile at suitable places.

A mat may be provided which is laid over the roof to prevent the users' feet from scratching the enamel. This mat may be held in place by having its rear edge inserted beneath the pads of the front mountings of the frame.

What I claim as my invention and desire to secure by Letters Patent is:

A seat-supporting structure for mounting on the roof of an automobile, comprising a seat-supporting frame which extends transversely across said roof and consists of two main frame members each consisting of at least two tubes detachably connected together endwise and two side frame members each having two ends, said main frame members extending with a sliding fit through holes adjacent the ends of said side frame members, said holes having a substantial length dimension affording lateral rigidity of said side frame members on said main frame members, clamping means for rigidly clamping said main frame members in said holes, an arm projecting outwardly from each of said side frame members parallel to said main frame members, each said arm extending with a sliding fit through an aperture intermediate the ends of said frame member, said aperture having a substantial length dimension affording lateral rigidity of said arm in said side frame member, clamping means for rigidly clamping said arms in said apertures, tightenable anchoring means secured to said arms outwardly of said side frame members adapted for detachable connection to roof side ledges to hold said structure in place on said roof and adapted when tightened to exert a torque on said side frame members tending to bow said main frame members upwardly, and legs rigidly secured to said side frame members adjacent their ends providing means adapted to support said frame upon said roof, said legs including means for adjusting their length.

References Cited in the file of this patent

UNITED STATES PATENTS

| | | |
|---|---|---|
| 1,531,837 | Boldin | Mar. 31, 1925 |
| 2,186,584 | Halvorsen | Jan. 9, 1940 |
| 2,641,396 | Parr | June 9, 1953 |
| 2,645,391 | Deschamps | July 14, 1953 |
| 2,684,796 | Swenson | July 27, 1954 |

FOREIGN PATENTS

| | | |
|---|---|---|
| 502,494 | Great Britain | Mar. 20, 1939 |
| 699,968 | Great Britain | Nov. 18, 1953 |
| 813,987 | France | May 8, 1937 |
| 843,051 | France | Mar. 20, 1937 |
| 866,287 | France | Apr. 21, 1941 |
| 1,004,579 | France | Nov. 28, 1951 |

OTHER REFERENCES

Magazine article from "Popular Mechanics" page 10, Aug. 1951.